(No Model.)

G. W. MILLER.
CAR WHEEL.

No. 509,579. Patented Nov. 28, 1893.

WITNESSES
Newton G. Leslie
Frank M. Spaulding

INVENTOR
George W. Miller
By Lucius C. West
Atty

UNITED STATES PATENT OFFICE.

GEORGE W. MILLER, OF KALAMAZOO, MICHIGAN.

CAR-WHEEL.

SPECIFICATION forming part of Letters Patent No. 509,579, dated November 28, 1893.

Application filed February 27, 1893. Serial No. 463,939. (No model.)

*To all whom it may concern:*

Be it known that I, GEORGE W. MILLER, a citizen of the United States, residing at Kalamazoo, county of Kalamazoo, State of Michigan, have invented a new and useful Car-Wheel, of which the following is a specification.

This invention relates to that class of car wheels which are composed of metal rims and hubs, and spokes connecting said hub and rim, and it has for its object to effect greater simplicity, compactness and solidity, and to facilitate the centering and aligning of the hub, truing the rim, tensioning the spokes and the ready replacing of the spokes by the construction clearly set forth in the following description and claim.

Figure 1:
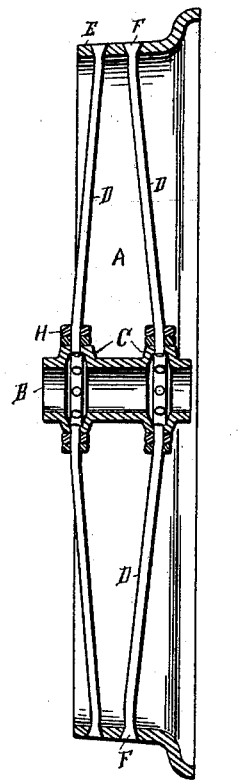
Figure 2:
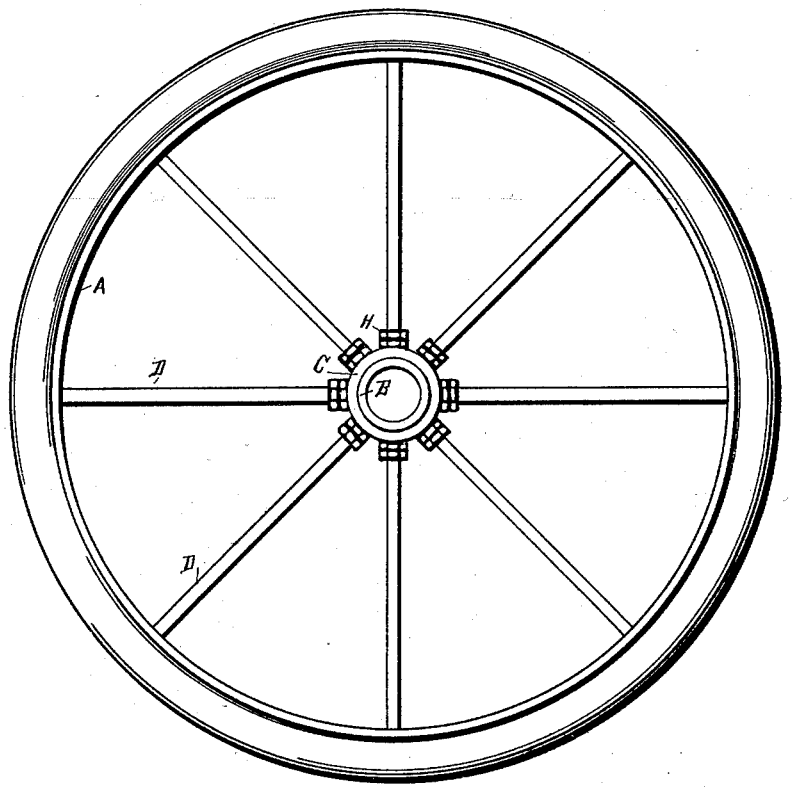
Figure 3:
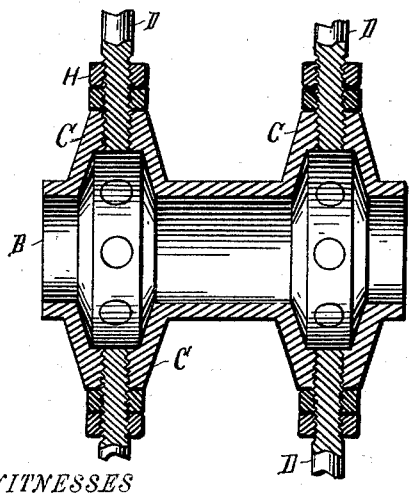

In the drawings forming a part of this specification, Figure 1 is a central vertical section of Fig. 2, looking from a point at the left. Fig. 2 is an elevation of Fig. 1, looking from a point at the right; and Fig. 3 is an enlarged view of the hub and connecting parts in Fig. 1.

Referring to the lettered parts of the drawings, A is the wheel-rim, pressed into shape from sheet steel.

The wheel-hub, B, consists of a tubular portion for keying on the axle (axle not here shown) provided with raised, circular, peripheral portions, C, one near each end of said tubular portion B, said tubular portion and raised portions C being all in one integral whole, constituting the hub of the wheel, which, by virtue of being thus made, is very simple, compact and solid, with no liability of any portion of the hub getting out of true in relation to the other portions, as is frequently the case with hubs composed of different separate parts. The tread part, E, of the rim is provided around the same with two rows of countersunk holes, made entirely through said tread part, said two rows of holes being separated laterally from each other when the wheel is viewed in cross section, as in Fig. 1, thus bracing and supporting the rim both sides of the center of the tread part.

The spokes, D, consist of metal rods, of a size to be passed through the holes in the tread part, E, of the rim, from the outside, and are provided with flaring heads, F, snugly and detachably fitting the countersunk holes when the spokes are in place, as in Fig. 1. The inner ends of these spokes, D, are screw threaded and are screwed into screw threaded radial holes in the peripheries of the raised portions C of the hub, Fig. 3.

In putting the wheel together, the hub can be readily and accurately centered and aligned by turning the desired spokes in one direction or the other, finally leaving them tightly tensioned. The tensioning of these spokes can be readily accomplished by means of a wrench gripping the body of the spokes, since their countersunk heads will turn in the holes in the tread part of the rim and their threaded ends will turn in the threaded holes of the raised portions, C, of the hub. By this means any unevenness in the true circle of the rim can be corrected. To illustrate: Should it be discovered that any portion of the periphery of the rim was unduly depressed or raised, such condition could be corrected by tensioning the spokes, bearing in mind, of course, to tension others in relation to the aligning of the hub, so that eventually the rim will be true and the hub accurately aligned and centered.

At H are shown jam-nuts on the threaded ends of the spokes, fitting against the peripheries of the raised portions, C, of the hub. These nuts, H, are set tight as each spoke is tensioned, thus firmly attaching the spokes and forming a shoulder to receive a portion of the strain on the spokes and to more surely fix and keep them in their desired position as tensioned.

It is preferable that the raised portions, C, of the hub, shall be cored out internally, so as to be hollow, said hollow interior communicating with the interior of the tubular portion of the hub, as shown in Fig. 3, thus making the hub lighter, and that the radial holes shall lead into said hollow interiors of the raised portions, C. By this means, should a spoke become broken in a manner that it would be difficult to remove its threaded end outward from the hole in the raised portion of the hub, it could be driven out of the hole into the hollow interior of the raised portion, C. Thus any spoke can be readily replaced, by inserting a new one through the hole in the rim of the wheel and screwing it into the hole in the raised portion of the hub.

Having thus described my invention, what I claim as new, and desire to secure by Letters Patent of the United States, is—

A car wheel comprising a rim provided with countersunk spoke-holes therethrough, a hub consisting of the tubular portion and hollow raised portions, the hollow interior of said raised portions communicating with the interior of the tubular portion, said raised portions being provided with screw-threaded spoke-holes leading into the hollow interior, and spokes provided with heads detachably fitting the countersunk holes in the rim, the other ends of said spokes being screw-threaded and detachably screwed into the holes of the raised portions of the hub; substantially as set forth.

In testimony to the foregoing I have hereunto subscribed my name in the presence of two witnesses.

GEORGE W. MILLER.

Witnesses:
HORACE S. HAINES,
JACOB REIDSEMA.